June 1, 1926.
C. O. NICHOLAS
MOLD
Filed April 6, 1925  2 Sheets-Sheet 1
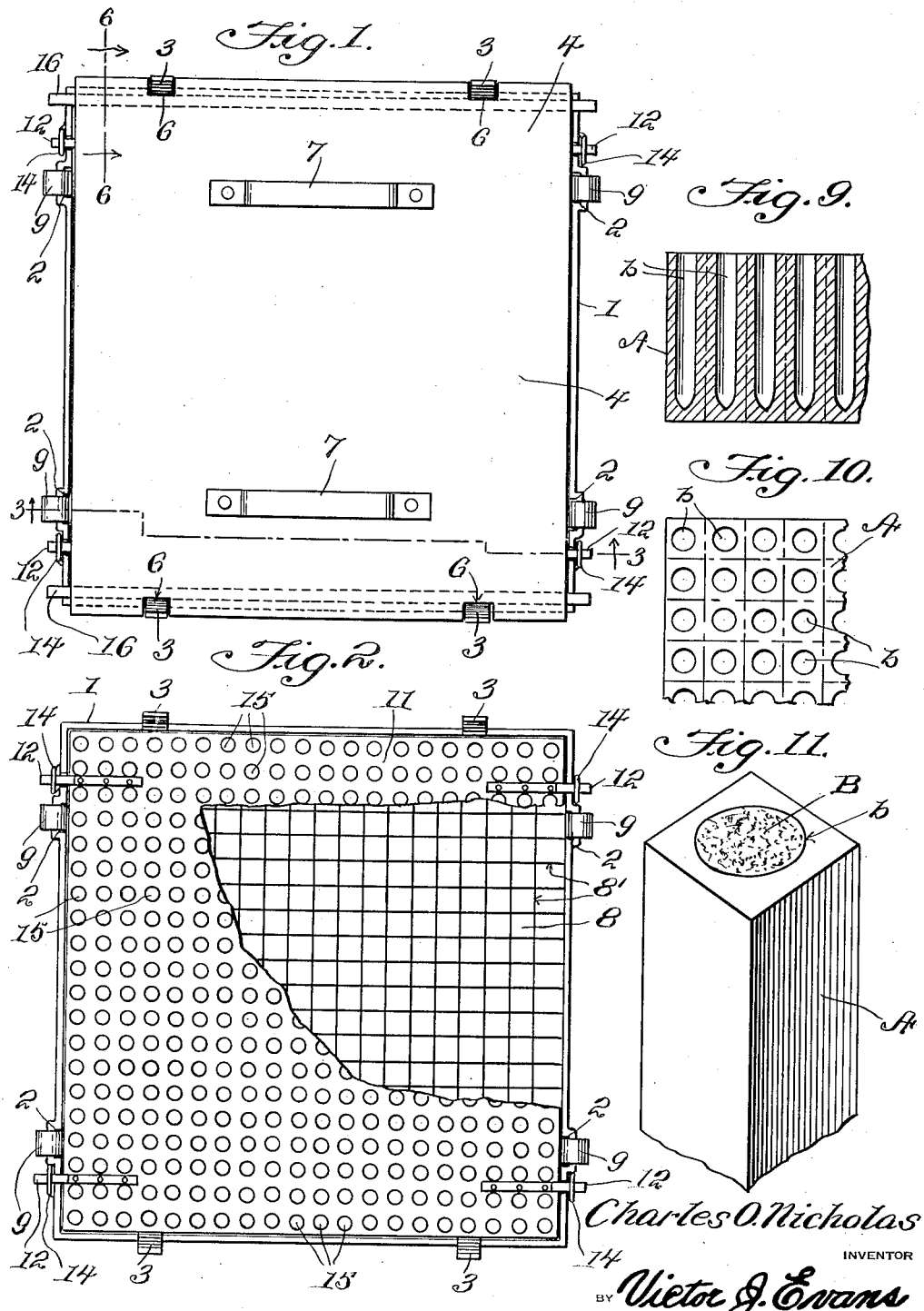

June 1, 1926.
C. O. NICHOLAS
MOLD
Filed April 6, 1925    2 Sheets-Sheet 2
1,587,402
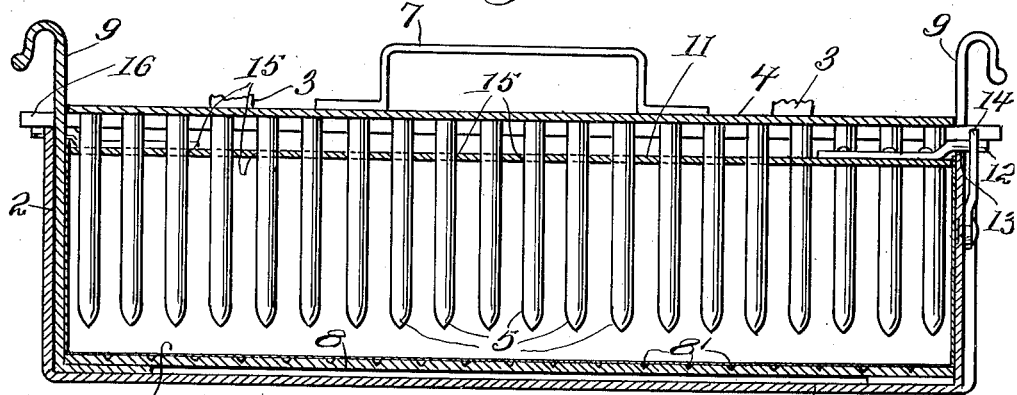
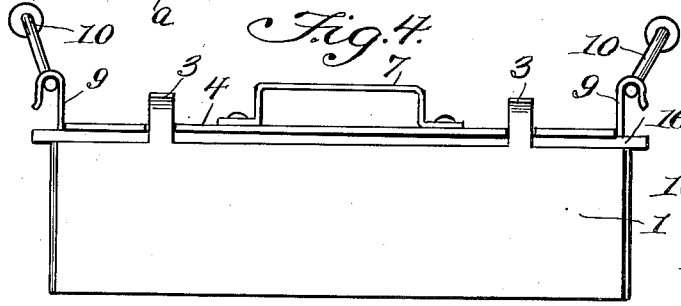
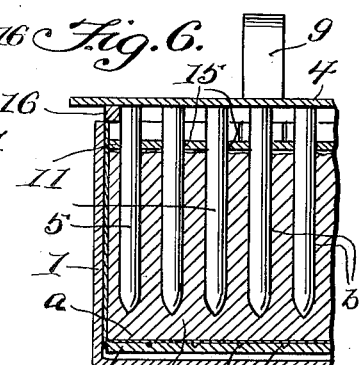
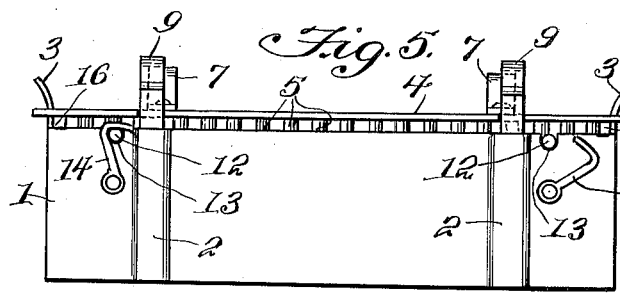
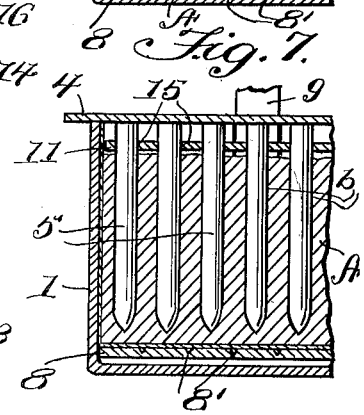
Charles O. Nicholas
INVENTOR
BY Victor J. Evans
ATTORNEY
WITNESS: J. T. L. Wright Patented June 1, 1926.

1,587,402

UNITED STATES PATENT OFFICE.

CHARLES O. NICHOLAS, OF RICHMOND, VIRGINIA.

MOLD.

Application filed April 6, 1925. Serial No. 21,186.

This invention relates to a confection and to the mold for making the same, the general object of the invention being to provide means for producing articles of elongated form and composed of ice cream or the like with a filling of other material.

Another object of the invention is to provide means for molding the articles with a simple hole for receiving the filling and with means for facilitating the separation of the individual articles.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the mold.

Figure 2 is a plan view with the cover removed and parts broken away.

Figure 3 is a sectional view through Figure 1.

Figure 4 is a side view.

Figure 5 is a side view taken at right angles to Figure 4.

Figure 6 is a section on line 6—6 of Figure 1.

Fig. 7 is a similar view with the parts in a different position.

Figure 8 is a view showing the tray with the molded material thereon about to be placed in the cutting pan.

Figure 9 is a fragmentary sectional view through a portion of the molded material.

Figure 10 is a plan view of Figure 9.

Figure 11 is a perspective view of a portion of one of the finished articles.

In these views. 1 indicates the main receptacle which is provided with the vertical recesses 2 in two of its sides, and with the guiding fingers 3 on its opposite sides. This receptacle is closed by the cover 4 which carries the depending pins 5. Two opposing edges of the cover are provided with the notches 6 for receiving the fingers 3 and said cover is provided with the handles 7. A tray, composed of the plate 8 and the handle forming strips 9, is adapted to be placed in the receptacle to hold the material being molded. The strips 9 have their lower ends bent and connected with the bottom of the plate and these strips engage the recesses 2 and their upper projecting portions form guides for the cover 4 and their upper ends are bent into hook shape to receive the handle members 10 so that the tray can be easily placed in the receptacle and removed therefrom. The upper face of the plate 8 is provided with the two sets of grooves 8′, one set being arranged at right angles to the other set so that the surface of the plate is divided by these grooves into a plurality of squares. A top plate 11 is provided with the projections 12 which are adapted to engage notches 13 formed in the upper edges of the receptacle 1 and to be held in said notches by the latches 14 which are pivoted to the receptacle. This plate is provided with the circular holes 15, through which the pins 5 pass, one of these holes being arranged over each square on the tray plate.

The tray is placed in the receptacle 1 and then a sheet $a$ of paper or the like is placed on the bottom of the tray with its edges bent up to engage the side walls of the device. Then the material from which the articles are formed is placed in the device and the top plate 11 put in position. Then the cover 4 is placed, its pins passing through the holes 15 in the top plate and entering the material. This plate or cover 4 is held in spaced relation to the receptacle by means of the bars 16 placed at each side of the device. The device is then placed in ice or in a freezing device where its contents will be frozen. After the material has been properly frozen, the strips 16 are removed and the top pressed down until it rests on the receptacle. This action will prevent the material from sticking to the pins when the pins are withdrawn by the removal of the top or cover. The cover is then removed and the plate 11 is also removed. The handle members 10 are then placed in engagement with the hooked ends and the tray with the material thereon lifted from the receptacle and placed in a receptacle 17, the walls of which are provided with the vertical slots 18 which are so arranged that they will align with the grooves 8′ in the tray plate. The upper ends of the slots are enlarged, as shown at 18′. A knife or other cutting device is then passed through the slots 18 and pressed downwardly through the material until it strikes a groove 8′, the knife being passed through each pair of slots until the entire block of material is divided into squares as shown in Figures 9 and 10. Each article will have a longitudinally extending hole in its center which terminates a short distance from the bottom thereof as shown in Figure 11 where the article is shown at A and the hole at *b*. This hole is adapted to receive a filling of cake, nuts or any other desired material, as shown at B in Figure 11.

From the foregoing, it will be seen that I have produced a device for forming stick-like articles of ice cream or the like which is provided with a central hole for receiving a suitable filling. The shape of the article is such that it can be readily eaten by biting off pieces from an end thereof or the article can be sliced with a knife or the like and eaten this way.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a receptacle, a tray adapted to be placed in the same and to receive the material to be frozen, said tray having grooves in its bottom which are arranged at right angles to each other to divide the bottom into squares, a top plate having perforations therein, each perforation being arranged over a square when the plate is in position, means for removably holding the plate in the receptacle, a cover plate for the receptacle, and depending pins thereon passing through the perforations into the material on the tray for forming holes in said material.

In testimony whereof I affix my signature.

CHARLES O. NICHOLAS.